Patented July 4, 1933 1,916,901

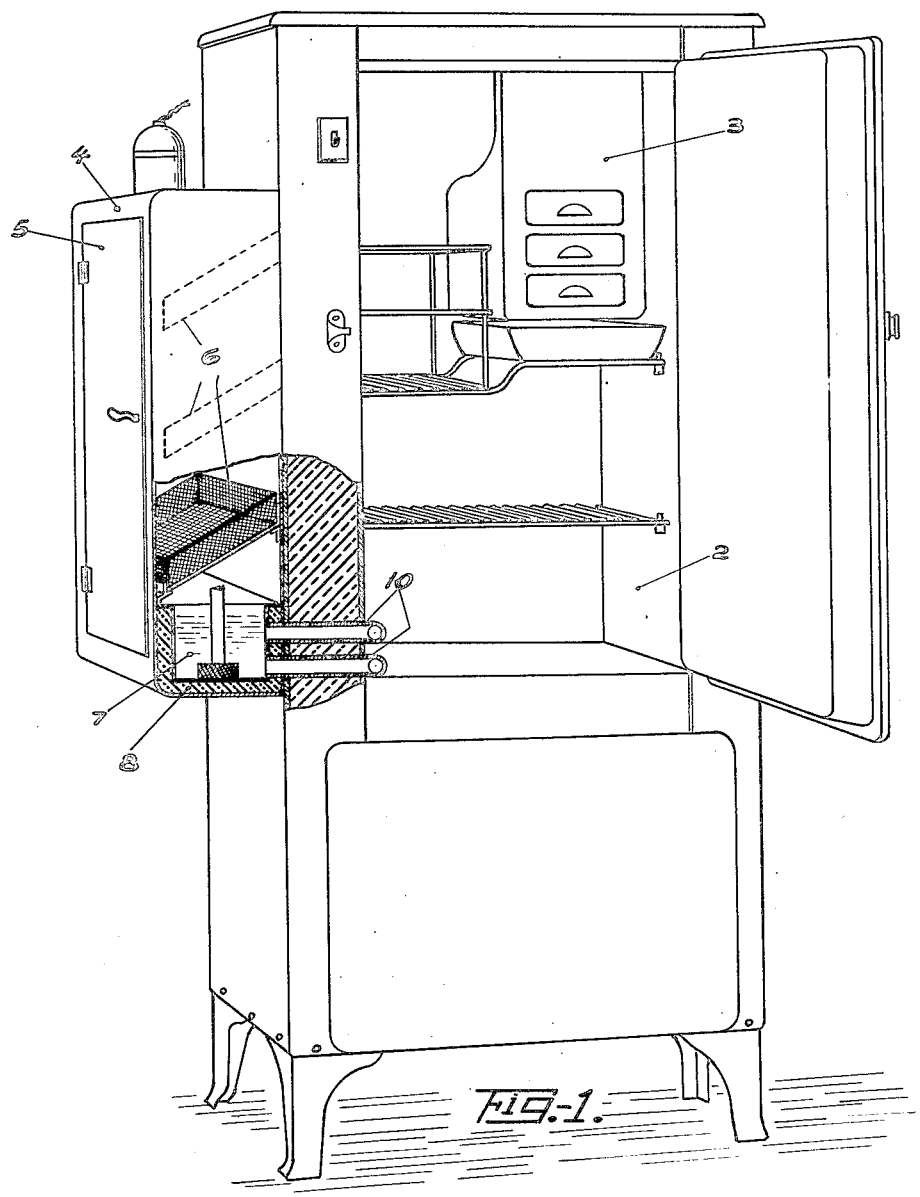
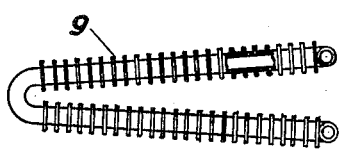

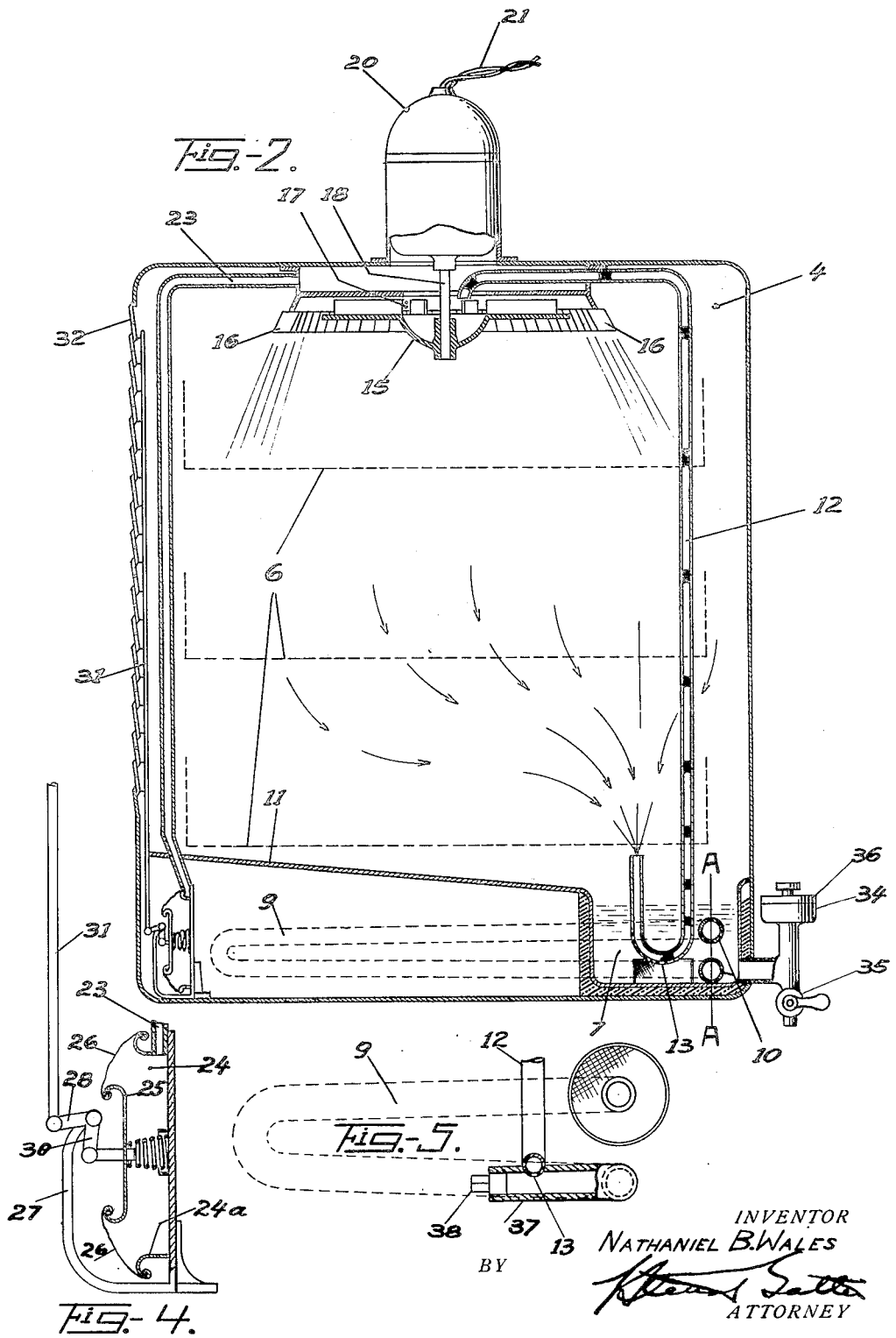

UNITED STATES PATENT OFFICE

NATHANIEL B. WALES, OF NEW YORK, N. Y., ASSIGNOR TO VAPOREDAIR CORPORATION, OF NEW YORK, N. Y., A CORPORATION OF NEW YORK

REFRIGERATING SYSTEM AND STRUCTURE THEREFOR

Application filed October 29, 1932. Serial No. 640,290.

This invention relates to a new type of refrigerator in which adequate provision is, for the first time, provided for the preservation of all kinds of vegetables, flowers, and the like. Hitherto, it has been conventional to provide a small covered tray or equivalent located directly in the cold chamber of a refrigerator to preserve all vegetables. Such devices are inadequate to preserve vegetables in good, crisp condition, due to their deficiency in providing proper atomization of water to seal the pores of the vegetables together with a periodical evaporative and aeration interval. A continuous chill alone tends to wither vegetables.

I therefore, now provide a refrigerator with two contiguous chambers, the one for milk, butter, meats and food stuffs requiring only a lowering of temperature for their preservation, and the other preferably uninsulated and provided with controlled openings to the atmosphere and having means to periodically atomize chilled water and positively circulate it through this chamber. I furthermore chill the water to be atomized in this secondary chamber by utilizing the refrigerative effect in the primary chamber. In this manner, considering my refrigerator as an entity, I provide ideal preservative conditions for all kinds of eatable food stuffs. A further object is to provide such an arrangement in the refrigerator wherein the water to be atomized will not freeze or too greatly chill and shock the vegetables. A further object is to permit the chilled water available for atomization to be easily and completely drained off and a fresh supply added from time to time as required. In order to minimize the refrigeration required to chill and keep chilled the water to be atomized, I preferably insulate the sump in which it is contained in the secondary chamber. Another important object of my invention is to provide simple means of atomizing and circulating the atomized water through the secondary chamber as well as to elevate it into the atomizing means. In fact all three functions of elevating, atomizing and providing a forced circulation are accomplished by a single moving element, an electric motor driven blower. I not only do this but I utilize the drop of pressure formed by the suction side of the blower when in operation to close the shutters which control the evaporative periods in my secondary chamber.

Another object is to provide for a thermal circulation between the two chambers of the chilled water circuit in readiness for atomization.

The invention as herein illustrated must be considered as one preferred embodiment only of my invention as those skilled in the art can readily combine and coordinate my new system in a number of variations. In the accompanying drawings, Figure 1 is a side elevation in perspective and in partial cross section showing my refrigerative system. Figure 2 is a full section in elevation of the secondary chamber and Figure 3 is the element I use to chill the water to be atomized in exterior elevation. Figure 4 is an enlarged section of the bellows assembly. Figure 5 is a modification of my thermal circulation by utilizing the suction of the blower to draw chilled water directly out of the refrigerated element.

Referring more particularly to the drawings in order to fully describe the operation of my invention in Figure 1, numeral 2 is the insulated chamber which provides a chilling factor only equipped with a refrigerating machine of any kind or description and which I may refer to as the primary chamber having an evaporating chamber 3. 4 is the second chamber which may be of any relative size in respect to the primary chamber. 5 is a door for access thereto and 6 are containers or shelves for the vegetables or the like to be placed therein. 7 is the water sump in chamber 4, being encased in any insulation 8 and connected to the chilling element or chill transferring surface by the two pipes 10 to form an open thermal water circuit with sump 7. 11 is an inclined draining surface leading into the sump 7. 12 represents one or more capillary suction tubes which at one end terminate in the sump in a U, the open end being above the water level at 14 and the base of the U being submerged and having a small orifice 13 therein. The other end of the tube or tubes is connected to a chamber 17 which is open to the suction of the high speed blower or fan 15. 16 is a baffle against which the water entering the blower 15 by the lowered pressure of its suction is impelled by the high speed blower against the baffle 16 to thoroughly shatter or atomize the water. 18 is the motor shaft to which the blower is connected in any well known manner. 19 represents any small high speed motor and within the casing, 20 is a time switch of any well known construction which starts and stops the motor in predetermined intervals. 21 is the electric supply wire for the motor. 23 is a small tube connecting the suction chamber of the blower 17 to a vacuum operated bellows 24 having a centrally disposed rigid disc 25 connected by flexible rubberized cloth 26 or other suitable material to the metal frame 24a. 27 is an arm supporting the bell-crank 28 which is connected in any conventional manner with the rod 30 fastened to disc 25. A rod 31 connects the bell-crank 28 with an arm 33 to operate a series of shutters 32 which may be positioned in either of the sides or rear panel or both. A special fixture 34 is connected to the base of the insulated sump 7 terminating at its bottom in a drain cock 35 and at its top by a filler cap 36 so positioned in height that the sump cannot be over filled. A screen fixture 37 covers the small orifice 13 in the base of the suction U tube 12.

My novel refrigerator operates as follows:

The main refrigerative source to refrigerate chamber 2 having been started which may be on the same circuit as the electric supply wire 21, the water in the sump 7 drops in temperature due to the chilling effect of element 9 exposed to the lowered temperature of chamber 2. When the time switch in case 20 dictates the motor to start, the blower creates a suction in the small tubes 12 which are approximately $\frac{3}{16}$ inch, inside diameter. The end of the tube or tubes being open to the air at 14 and the orifice 13 being submerged and open to water from the refrigerated sump 7, a series of water slugs are created in the vertical tubes 12, their size and frequency depending on the relation of the small water orifice 13 to the size of the air inlet 17. In this manner, there passes through the blower a commingling of water and air volumes which are mixed and shattered to form an atomized vapor which to the eye appears like a dense fog of refrigerated vapor. Due to the force of gravity and the forced downward circulation formed in the chamber 4 by the suction openings 14 and the discharge of the blower 15, the cold fog so produced envelops the vegetables in the containers. After a predetermined time, the time switch stops the motor 19 and the suction pressure exerted in the tube 23 connecting the blower chamber 17 with the bellows frame 24 ceases, the spring 37 exerts its pressure to open the shutters 32 permitting a natural circulation of air to take place in the chamber 4. This circulation is enhanced by a portion of the chamber 4 being chilled by the refrigerated sump as compared with the rest of the chamber, the temperature differential therefore stimulates this circulation of air which produces an evaporation of the moisture on the vegetables and aerates the same to prevent rotting as would be the case if they were placed in a closed continually moist chamber. It is to be noted that the sump water 7 can also be refrigerated by obtaining a direct contact and interchange between the element 9 or its equivalent and the evaporator 3. The period of aeration and evaporation is of longer duration than the period of chilled atomization. A remarkable degree of preservation of vegetables is obtained by this invention, all of which enhances the value of refrigeration to the home or store. Spinach the most sensitive of vegetables, will keep in crisp eatable condition for over four days. In Figure 5 I show a modification in which I substitute the suction of the fan in exerting a flow of water through orifice 13 for thermal circulation by making a closed connection with pipe 37 which directly connects the orifice 13 to the refrigerating element 9. In this manner I obtain a positive and direct flow of refrigerated water to the blower 15.

I may, of course, attach any type of commercial filler 35*a* to the drain cock 35 in order to make cold water available for drinking.

What I claim and desire to secure by United States Letters Patent is:

1. A refrigerator for vegetables and the like having means to refrigerate a body of water therein, said refrigerator comprising an uninsulated air accessible chamber having containers for said vegetables in said chamber and means for atomizing and distributing said refrigerated water through said containers.

2. A refrigerator comprising a main insulated chamber and means to refrigerate said chamber, a secondary uninsulated chamber adjacent said insulated chamber, means in said secondary chamber to atomize and distribute water therethrough and means to refrigerate said water in said secondary chamber from the lowered temperature in said main chamber prior to its atomization.

3. A refrigerator for the preservation of vegetables and the like, having means to refrigerate a body of sump water contained therein, shutters for controlling an air opening in said refrigerator, an electric motor operated blower, and means operated by said blower to elevate the refrigerated water from said sump into said blower to atomize said water and means operated by the drop of pressure on the suction side of said blower to open and close said shutters as and when said blower starts and stops.

4. A refrigerator for the preservation of vegetables and the like having means to refrigerate a body of water located in a sump in its base, said refrigerator having open containers for said vegetables therein, an electric motor operated blower positioned in the top of said refrigerator and means operated by said blower to elevate said refrigerated sump water and atomize and distribute said water over said containers.

5. A refrigerator for the preservation of vegetables and the like having means to refrigerate a body of sump water positioned in the base of said refrigerator, containers for holding said vegetables in said refrigerator, an electric motor operated blower and means connected therewith to elevate said refrigerated sump water into said blower to atomize said water and duct means to force a circulation of air and atomized water through said container.

6. A refrigerator having a source of refrigeration and comprising two chambers, the one adapted to be maintained at a relatively low temperautre and the other at a relatively high temperature and refrigerative means to refrigerate a water sump positioned in the base of said relatively high temperature chamber, said refrigerative means derived from said low temperature chamber and means operated by an electric motor to atomize and distribute said refrigerated water from said sump through said chamber.

7. A refrigerator having a source of refrigeration and comprising an insulated refrigerated chamber and an uninsulated unrefrigerated chamber, a water sump in the base of said uninsulated chamber, said sump being surrounded by insulation, refrigerative means to refrigerate said sump water, said refrigerative means derived from said low temperature chamber, and electric motor operated means to atomize said refrigerated sump water and distribute it throughout said uninsulated chamber.

8. A refrigerator having a source of refrigeration, having two or more chambers, one of said chambers adapted to be maintained at a relatively low temperature by said source of refrigeration, and another of said chambers adapted to be maintained at a relatively high temperature, refrigerative means derived from said source of refrigeration to refrigerate water, means to atomize and distribute said refrigerated water through said high temperature chamber.

9. A refrigerator having a source of refrigeration, having two or more chambers, one of said chambers in open contact with said source of refrigeration and another of said chambers in indirect contact with said source of refrigeration, refrigerative means derived from said source of refrigeration to refrigerate water, means to atomize and distribute said refrigerated water through said chamber having indirect contact with said source of refrigeration.

In witness whereof, I have hereunto set my hand to these specifications, this 24th day of October, 1932.

NATHANIEL B. WALES.